July 7, 1959 A. FERMANIAN 2,894,183

TRANSISTOR SUB-ASSEMBLY

Filed May 1, 1956

INVENTOR.
ARMEN FERMANIAN

BY Roland A. Dexter

HIS ATTORNEY

Patented July 7, 1959

2,894,183

TRANSISTOR SUB-ASSEMBLY

Armen Fermanian, Stamford, Vt., assignor to Sprague Electric Company, North Adams, Mass., a corporation of Massachusetts Application May 1, 1956, Serial No. 581,911

5 Claims. (Cl. 317—235)

This invention relates to transistors and more particularly to a pressure-contact electrode sub-assembly for transistors.

This application is a continuation-in-part of my copending applications Serial No. 371,867, filed August 3, 1953 (now abandoned) and Serial No. 465,897, filed November 1, 1954 (now abandoned).

Prior art transistor constructions show many different attempts to provide the proper electrode contact to the semi-conductor crystal. Notable among these prior art developments have been the "catwhisker" for point contact transistors and the fused lead for junction-type transistors. However, all of the known prior art constructions have had the deficiencies of requiring costly precision apparatus and highly skilled manual assembly methods characterized by the use of microscopes. These factors of expensive tooling and time consuming precision assembly, contribute not only to high cost per unit and low yield, but also provide extremely poor reproducibility.

It is therefore an object of this invention to provide an inexpensive easily assembled transistor which is capable of a high degree of reproducibility.

A further object of this invention is to provide a transistor construction which will permit the use of assembly line mass production techniques.

A more specific object of this invention is to provide a contact electrode sub-assembly which may be used without change in either point or junction-type transistors.

Another specific object of this invention is to provide a strip or foil point contact having a high degree of lateral stability and having an extremely fine needle-like point.

Briefly, the objects of this invention are obtained by providing a transistor construction whereby a contact sub-assembly is manufactured apart from the transistor crystal and which sub-assembly may be used interchangeable upon either point contact transistors or junction transistors.

The above stated objects of this invention and others as will appear during the course of the description are better understood when considered in conjunction with the drawing in which.

Figure 3:
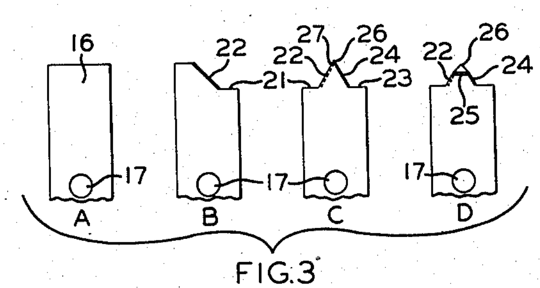
Fig. 3 is a four-part view showing the steps in the production of the point contact.

Referring first to Fig. 3, there is shown a four-step procedure for cutting the strip material contacts to provide pointed ends. Utilizing a suitable holding device (not part of this invention) to ensure against movement of the strip 16 during subsequent cutting operations, the strip is provided with an index which may be in the form of a hole 17 as shown in Fig. 3A. The index is employed in later assembly procedures. The holding device carrying strip 16 is then positioned in a shear type cutter, and the first cut is made. This first cut shown in Fig. 3B produces a shoulder 21 and an edge 22 which may be truly perpendicular or may be slightly bevelled. The holding device is then turned over and reinserted in the cutter for the second cutting step of Fig. 3C. This second cutting produces a cut which is the mirror image of the first and provides a shoulder 23 and an edge 24. The final contact forming step is that shown in Fig. 3D in which point 26 of Fig. 3C is bent about line 25 until the point 26 is self-sustaining in a plane approximately 85° from the plane of the rest of the strip. The resultant strip has the general overall appearance of a miniature beer-can type can opener.

The operations shown in A, B and C can be combined into a single operation quite readily, that is, the index 17 and the entire point 26 may be punched out with a single actuation of a suitable press. It should be understood, however, that an important advantage to the multi-step procedure outlined in the preceding paragraph is that both sides of the point are cut by the same shearing edge, thereby, more accurately controlling the point. Also since the angle of edges 22 and 24 are such that the edges intersect rearwardly of the original leading edge of strip 16, a clean point is obtained.

Figure 4:
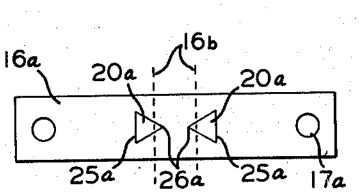
Fig. 4 shows another embodiment of the point contact which is suitable where less precise transistor construction is required.

It is even possible to punch out two contacts at the same time should a lesser degree of precision be found acceptable for a given unit. Fig. 4 shows a strip $16^a$ which may be fitted into a holding nest in a punch press bed. The punch may be equipped with two indexing dies to produce indexes $17^a$, and may also be equipped with two point forming dies which are V-shaped and which may cooperate with suitable openings in the press bed to bend the strip material at lines $25^a$, so as to simultaneously perform the cutting and bending operations. Strip $16^a$ may then later be separated into two distinct contacts by cutting along lines $16^b$. The contact strips obtained by this method also produce members which have the appearance of triangular can openers generally known as beer can openers.

It is noteworthy to draw attention to the fact that points formed according to my above set forth teaching most unexpectedly produce a bevel 27 on the lateral or top, as seen in Fig. 3C, surface of the strip tapering to point 26. This unexpected result produces a truly pointed tip which provides excellent electrical characteristics.

Suitable materials for the preferred Fig. 3 embodiment of my inventive pointed strip contacts are beryllium copper for the emitter electrode and Phosphor bronze for the collector electrode. However, when the strip contacts are applied to a junction transistor one of the contacts will usually be the base contact rather than the collector; in which case it is possible to use a less costly material than Phosphor bronze for the second strip contact.

The preferred embodiment of Fig. 3 has been found to be highly successfully practiced by utilizing strip material ⅛" wide and 2 mils thick. Index 17 is approximately 0.4" from shoulder 21, which in turn is about 0.065" axially rearward of point 26. Shoulders 21 are roughly 0.047" wide. The location of bending line 25 is dependent upon the application and transistor type, e.g. it is patent that the transistors of Figs. 6 and 7 require points of different lengths. One example of wide application locates bending line 25 about 0.03" from shoulder 21.

Support member 12 is preferably of steatite or other ceramic material, because of the excellent mechanical and electrical stability exhibited by ceramics. Other suitable materials are thermoset resins, such as the formaldehyde resins, either in solid or laminated form. This support or base member 12 is generally rectangular and has a centrally located rectangular opening 14. Suitable dimensions given by way of example only are overall dimensions of 0.226" by 0.218" mils thick and an opening of 80 mils by 50 mils.

Adhesive 50 may be any adhesive capable of providing a strong metal to non-metal sealing. Furan adhesives, for example, exhibit outstanding adhesive characteristics to metals, ceramics and cured phenolics and whether impregnated throughout a tape material or coated upon both surfaces of a dielectric carrier film, exhibit the desired properties for use in my construction. For typical preparation of these thermosetting furan cements see United States Patents Nos. 2,366,049, 2,323,333, 2,267,830 and 2,689,237. Other pressure and heat sensitive adhesives include unsaturated polyesters, polyurethanes, and silicone resin. Particularly suitable for applications involving metal to ceramic as in my preferred construction, is the heat initiated epoxy type adhesives produced by the condensation of epichlorohydrin and bisphenol when catalyzed by an agent such as hexamethylene diamine at about 1% concentration (the amine is inactive at temperatures below about 75° C.). These latter resins are fully discussed in the "Electrical Manufacturing" issue of July 1949, at pp. 78–81, 164 and 166. My preferred embodiment utilizes a stamped-out adhesive film, e.g. Permacel by Minnesoto Mining and Manufacturing Company, about 1½ mils thick and roughly 0.19" square with a centrally located opening of around 60 by 90 mils.

Spracer 18 is of any chemically inert, hard, self-supporting material of low surface coefficient of friction and a thermal flow point preferably in excess of 200° C. My preferred material is Muscovite mica having a thickness of roughly 2 mils and dimensions of about 35 mils 35 mils. Another highly desirable spacer material is polytetrafluoroethylene. However, resinous materials as polyethylene terephthalate, polytrifluoromonochloroethylene, long chain polyamides, and phenol formaldehyde are suitable. Materials, such as glass and ceramic, which are not resinous are also satisfactory. Alternatively, metals protected by a relatively thick insulating coating can be used, e.g. anodized oil impregnated aluminum. The spacer should have a relatively low dielectric constant so as to minimize capacitive coupling between the two point contact electrodes, inasmuch as this seriously affects the electrical characteristics of the transistor. It is particularly desirable that the spacer not have a high surface coefficient of friction with the metal of the electrodes 6, 8 in order that each electrode can separately adjust itself to the desired contact pressure. The maximum practical width of the self-supporting spacer in terms of separation of the point contacts is from .1 mil to 5 mils with that range of from .5 to 3 mils being preferred. The optimum high frequency characteristics of my construction result with as close spacing as possible, i.e. with a 0.25 mil spacing the maximum frequency of use is in excess of 100 megacycles. For some circuits the optimum spacing is a compromise between high frequency response, which improves with smaller spacing, and base resistance which rises with smaller spacing. Thus spacings of 1 to 2 mils are the optimum for most circuit applications.

The semi-conductor die 30 for the point contact transistor use of my electrode sub-assembly may be prepared by any of the usual processes. By way of example only, the well-known Czochralski technique for pulling crystals from a molten mass may be used. In this process: a mass of germanium is kept slightly above the melting point of 934° C.; an impurity is added to the melt, in this case arsenic may be utilized to provide N-type germanium, in sufficient quantity to provide the desired resistivity for the grown crystal; and then a seed crystal is dipped into the melt and withdrawn slowly, with or without accompanying rotation of the seed or the melt or both. The grown single crystal boule, grown so that the long axis of the crystal is along the 100 direction, has a generally square cross-section and is preferably about 1¼" on a side. The crystal is then sliced about 16 mils thick, and then lapped on both sides to about 6 to 6½ mils. The slice is next diced to a rectangle of approximately 34 by 63 mils, with the die cut from the slice so that its edges are parallel to those of the natural faces of the slice. In the assembly steps, to be more fully described later, my electrode sub-assembly is oriented so that the points contact the die in the <110> direction.

Of substantial importance in the electrical performance of this device is the configuration of the electrode point. The tips of electrodes are triangular in cross-section with the base of the triangle in contact with the spacer 18. The cross-section of the tips near the points decreases in area as the die 30 is approached until at the point the area becomes infinitely small. Between the upper part of the tip 26 and the strip 16, the cross-section of the electrode is trapezoidal in form and can be somewhat distorted from the rectangular by the manufacturing operations. The configuration of the point 26 is substantially an inverted triangular pyramid.

Figure 6:
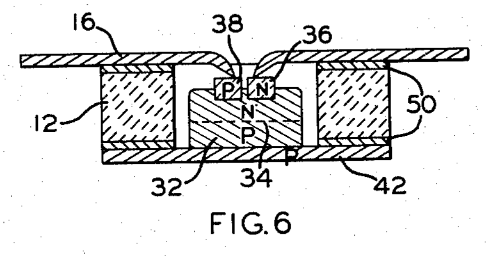
Fig. 6 is a showing of the sub-assembly of Fig. 1 positioned on the extended collector electrode of a junction-type transistor.

The semi-conductor 32 shown in Fig. 6 may be prepared in a similar fashion to that set forth above, noting that it is generally accepted practice to pull crystals to be used in junction transistors along a diagonal. The crystal is doped to produce junction 34 to establish a P-type zone in the N-type germanium. Collector contact plate 42 is provided on the P-zone and contains a P-type impurity. In a like manner, base contact plate 36 is fused into the N zone and contains an N type impurity. However, emitter contact plate 38 is fused into the N-zone and contains a P type impurity, e.g. indium, so as to provide a rectifying contact. The dimensions of semi-conductor 32 are generally similar to 30, usually of necessity somewhat larger.

Base 40 for the point contact units is of Kovar, nickel, or other high conductivity metal, and is in strip shape of 3 mil thickness and 40 mil width and is of great enough length to adequately support my electrode subassembly, usually slightly less than a half inch.

Figure 5:
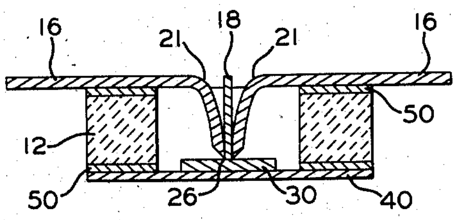
Fig. 5 is a showing of the sub-assembly of Fig. 1 positioned on the extended base electrode of a point contact transistor.

Special tools, which form no part of this particular application, are utilized in the assembly of my electrode sub-assembly. Assembly will be described for Fig. 5; it being obvious that slight changes will be required for the assembly of other embodiments.

The tools used in assembling the parts were designed to eliminate visual inspection during assembly and any manual manipulation of the points. The assembly process is completed by the tool itself. A ceramic base 12 is placed in the assembly tool and covered with a stamped-out piece of adhesive film 50. A point contact strip 16 is placed in position on each side of the assembly tool and secured in position. This is done with reference to the indexing hole 17. The exact distance between the points in the final assembly can be predicted and adjustments made for any spacing from .00025" to .004". Operation of a hand lever moves the points 26 together to a stop, then raises base 12 until it just contacts the under surface of the point contact strips 16. A heated plunger is brought down on the top side of the point contact strips 16 and with the application of pressure, seals the strips to the base 12. After sealing, the sub-assembly is removed from the tool and inspected for point alignment and spacing on a contour projector. The distance that the points project into the base is held to a very close tolerance (±.0005"). The length of the projection must be sufficient to insure that stable contact is made, but not great enough to deteriorate the electrical characteristics of the assembled transistor by excess contact pressure. The spacing of the points, as is well known, is a major factor in determining specific properties of the transistor. Ordinarily, the assembly tool is adjusted to produce a point spacing of .0015". A piece of .002" thick mica 18 is inserted in the slot of the base and between the points, effecting a point spacing of .002". The thickness of the spacer 18 can be varied (accompanied by a change in the setting of the assembly tool) to obtain a variety of characteristics of the completed transistor.

The loose ends of the point contact strips go through a shear and bending operation, in preparation for the final seal.

A germanium wafer (.034"×.063"×.006") is soldered on a strip of Kovar, then carefully cleaned and etched.

The point sub-assembly 10 is placed in the bed of a second tool which has a heated plunger. A piece of adhesive film 50 is placed over the base and the germanium sub-assembly laid on top: The plunger is then lowered and the Kovar strip is sealed to the base by the application of heat and pressure.

The assembly is spot welded to the formed wires 60 of a glass-metal stem which is designed for projection welding.

The unit is hermetically sealed by welding into a can, which is filled with oil for improved heat dissipation.

Figure 7:
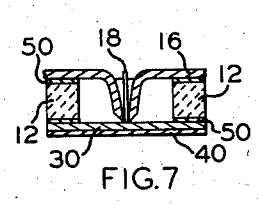
Fig. 7 is a showing of the sub-assembly of Fig. 1 positioned on the semi-conductor of a point contact transistor.

When electrical requirements demand a larger size semi-conductor, my sub-assembly may be secured directly to the semi-conductor as shown in Fig. 7.

In the Fig. 6 junction type semi-conductor embodiment, my sub-assembly may be mounted on either the collector electrode or on the crystal face.

Figure 8:
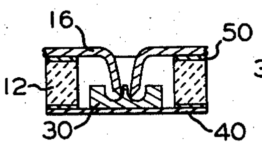
Fig. 8 is a showing similar to the showing of Fig. 5 in which the semi-conductor crystal is provided with a pair of recesses and an outstanding wall member which serves as spacer for the points.

Although the preferred embodiment of my device has been described as utilizing a spacer, it should be understood that inasmuch as the points 26 of my strip material contacts are more laterally rigid than the usual contacts by virtue of the width of strip 16, and because of the close tolerance thickness of member 12, the desired spacing may be maintained without spacer 18. Fig. 8 shows a modification whereby the semi-conductor 30 is etched to provide contact areas 31 and an integral spacer 19. My electrode sub-assembly 10 may be applied to Fig. 8 in the same manner as set forth above.

Figure 1:
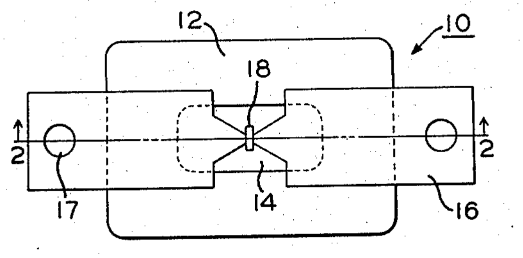
Fig. 1 is a top view of the sub-assembly showing the insulating base member with the contact electrodes secured in position.
Figure 2:
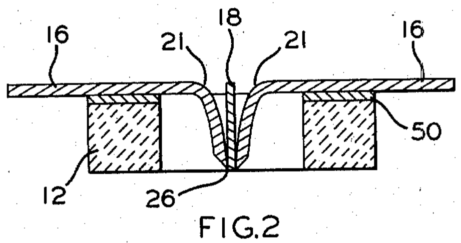
Fig. 2 is a section view taken along the line 2—2 of Fig. 1.
Figure 9:
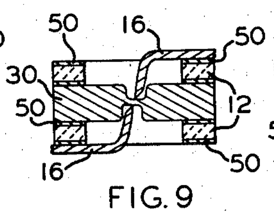
Figs. 9 and 10 are other modifications showing the use of two sub-assemblies similar to that shown in Fig. 1 for contact with opposite faces of semi-conductor crystals.
Figure 10:
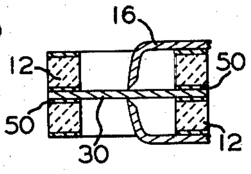
Figure 11:
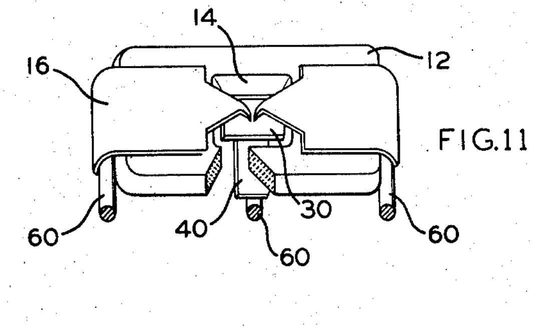
Fig. 11 is a perspective view of the transistor of Fig. 5 with the header pins secured in position.

Figs. 9 and 10 show use of my electrode sub-assembly for contacting opposite faces of semi-conductor crystals. In these modifications only one electrode 16 is secured to a support 12, and one of these sub-assemblies is secured to each side of the semi-conductor. Previous attempts at contacting opposite sides of a semi-conductor crystal have involved complex and time consuming mechanism for positioning the contacts directly opposite one another. My novel sub-assembly permits easy assembly of this type semi-conductor device by virtue of the accurate placement of contacts 16 on member 12, and the ease of reproducibility of member 12. The two sub-assemblies to be used to contact crystals 30 in Figs. 9 and 10 may be placed in a pivoted jaw plier-like holder against stop members which become a planar back wall when the jaws are brought together. Inasmuch as the contact electrodes 16 are accurately indexed and positioned on member 12, in the manner set forth above in the description of the assembly of Figs. 2 and 5, and the size of member 12 is rigidly controlled in its manufacture, the accurate positioning of the crystal may be accomplished simply by placing the crystal 30 on the sub-assembly which rests on the lower jaw of the holder, and then bringing the upper jaw, with its sub-assembly, down onto the crystal.

As many apparently widely different embodiments of this invention may be made without departing from the spirit and scope hereof, it is to be understood that the invention is not limited to the specific embodiments hereof except as defined in the appended claims.

I claim:

1. An electrode subassembly for semiconductor devices comprising a pair of point contact electrodes each consisting of a flat metal resilient strip of foil having a punched-out point, insulating means supporting said electrodes, said insulating means having means for defining an aperture, said electrodes secured to a surface of said insulating means, each of said metal foil electrodes having a body portion and a terminal portion projecting at right angles to the main body of the respective foil into the aperture, a pair of plane surfaces and a pair of sides arranged at a bevel to the plane of said surfaces to form each terminal portion, the respective terminal portions positioned in the aperture with the broadest dimensions of the said shaped terminal portions facing each other and a spacer held between said portions by the resiliency of said metal.

2. A semiconductor contacting assembly comprising a point contact lead of flat metal foil, a point contact on said lead, said point contact including one plane surface forming substantially all of one side of said point, a triangular pyramidal apex formed on said point contact having part of said plane surface as one of the surfaces of said pyramidal shape, said triangular pyramidal apex terminating in an extremely small contact area formed at the tip of said apex, a semiconducting crystal secured to an insulator member, an aperture through said member exposing a surface of said crystal, and said point contact lead being positioned on and secured to said insulator member, said apex small contact area being compressively positioned against said exposed surface portion.

3. A point contact transistor comprising an assembly of a pair of point contact electrodes, each consisting of a flat metal foil having a punched-out point formed at a right angle to the remainder of the respective metal foil, including one plane surface perpendicular to the remainder of said foil forming substantially all of one side of said point, a triangular pyramid formed at the apex of said punched-out point, said triangular pyramid on each point being inverted with the broad portion adjacent the remainder of the said punched-out point and so constructed and arranged as to form an extremely small contact area at said electrode tip, a semiconducting body having substantially planar opposed surfaces, a base electrode connected to one of said planar surfaces, an insulator member bonded to this assembly, means defining an opening in said insulator member exposing the other of said planar surfaces, said point contact electrodes being compressively positioned against said exposed planar surface with said respective plane surfaces facing each other and a spacer positioned between said facing surfaces.

4. A transistor assembly comprised of a semiconducting body, an emitter contact plate attached to said semiconducting body, a base contact plate in contact with said semiconducting body, an insulator member bonded in the assembly, a point contact electrode compressedly positioned against said emitter contact plate, another point contact electrode compressedly positioned against said base contact plate, each of said point contact electrodes consisting of a flat metal foil having a punched-out point formed at an angle to the remainder of the respective metal foil, including two plane surfaces at an angle to the remainder of said foil, a pair of sides of said punched-out point arranged at a bevel to said plane surfaces, a triangular pyramid formed at the apex of said punched-out point by said sides, said triangular pyramid on each point being inverted so as to form an extremely small contact area at said electrode tip, said small contact area being the compressedly positioned portion of the said point contact electrode.

5. The process for obtaining point contact transistors comprising the steps of shearing the ends of two metal foils to form an L-shaped point contact on each foil, forming a first angular side on one side of said punched-out point contact, forming a second angular side on the other side of said point contact, to give the body of each of said foil a trapezoidal shape, joining said angular sides at the apex of said point contact to form a triangular pyramid terminating in an extremely small contact area at the electrode tip, securing the foils to an apertured insulator member with the point contacts in the aperture, and fastening the insulator member to a semiconductor crystal having a face within the aperture and in contact with each of said point contacts.

References Cited in the file of this patent

UNITED STATES PATENTS

| | | |
|---|---|---|
| 2,696,575 | Fogg | Dec. 7, 1954 |
| 2,744,308 | Loman | May 8, 1956 |

UNITED STATES PATENT OFFICE

CERTIFICATE OF CORRECTION

Patent No. 2,894,183 July 7, 1959

Armen Fermanian

It is hereby certified that error appears in the printed specification of the above numbered patent requiring correction and that the said Letters Patent should read as corrected below.

Column 3, line 24, before "mils" insert -- by 28 --; line 56, before "35 mils" insert -- by --.

Signed and sealed this 19th day of January 1960.

(SEAL)

Attest:

KARL H. AXLINE

Attesting Officer

ROBERT C. WATSON

Commissioner of Patents